Jan. 22, 1929.  1,699,584
I. L. DAWSON ET AL
SHOCKING MACHINE
Filed Feb. 12, 1927  7 Sheets-Sheet 5
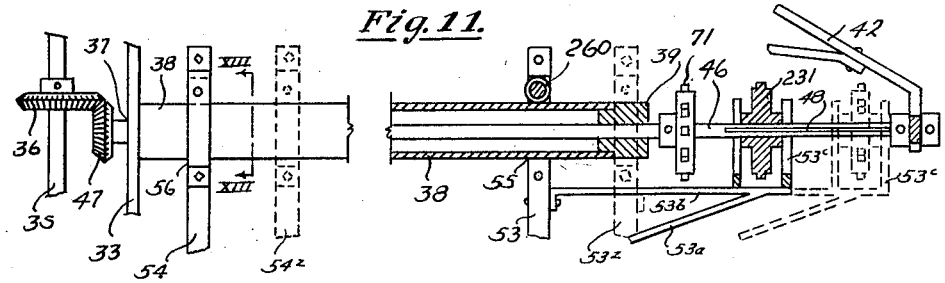
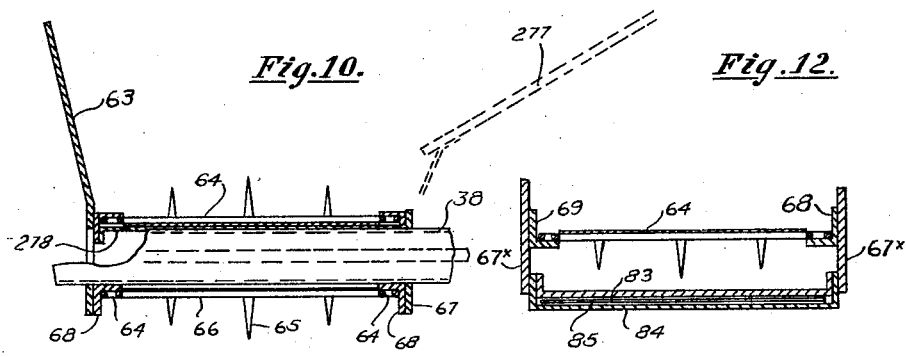
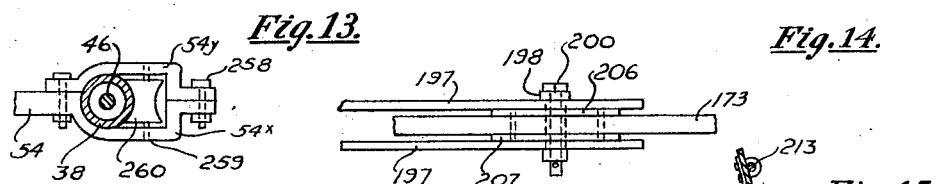
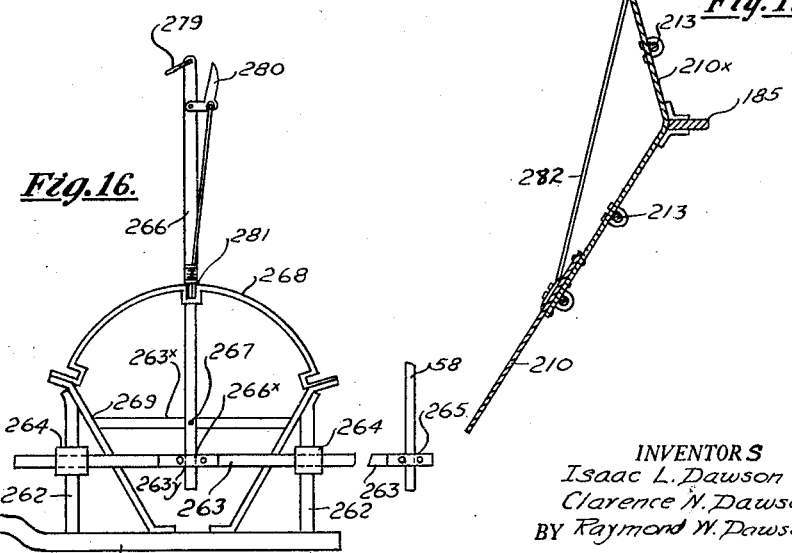
INVENTORS
Isaac L. Dawson
Clarence N. Dawson
BY Raymond W. Dawson
William Edwards ATTORNEY

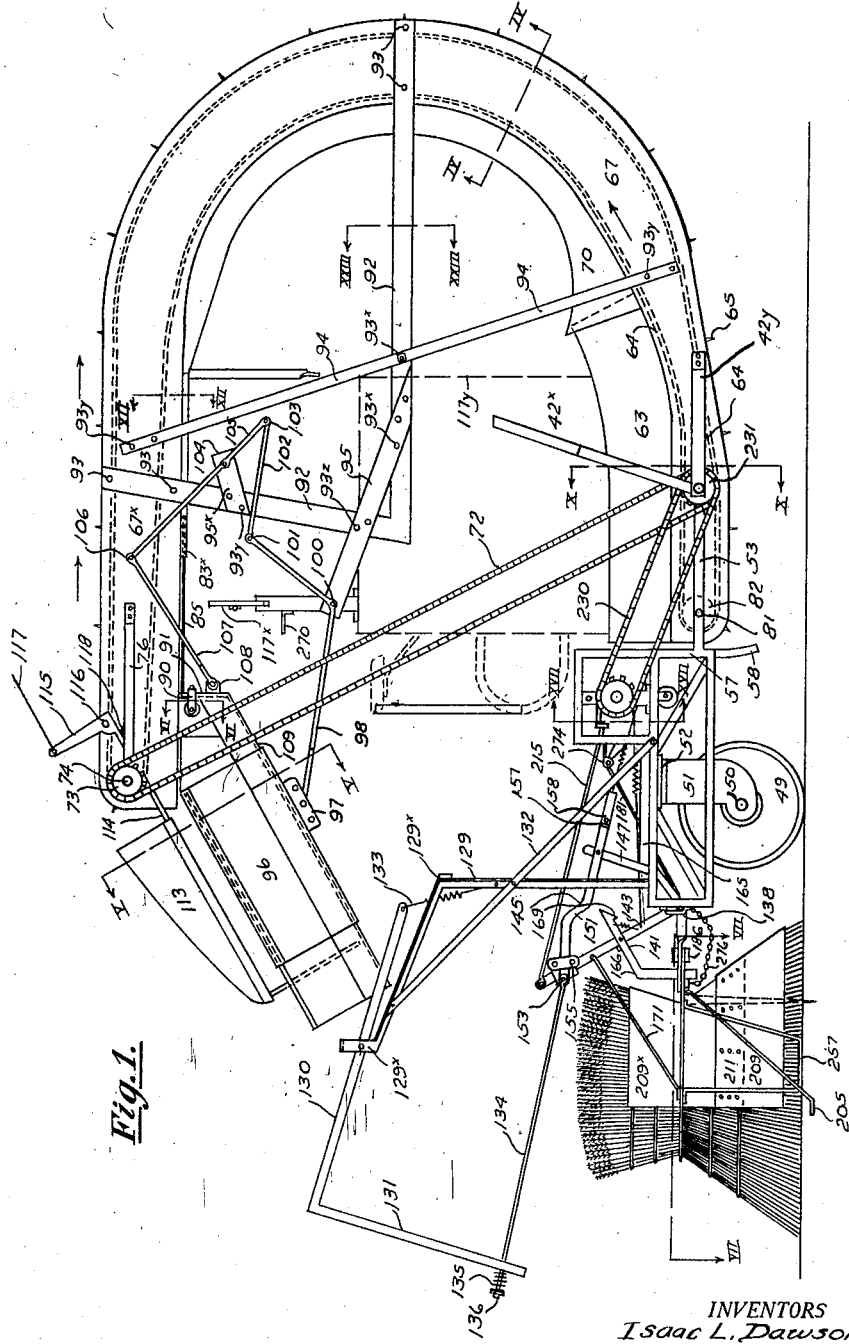

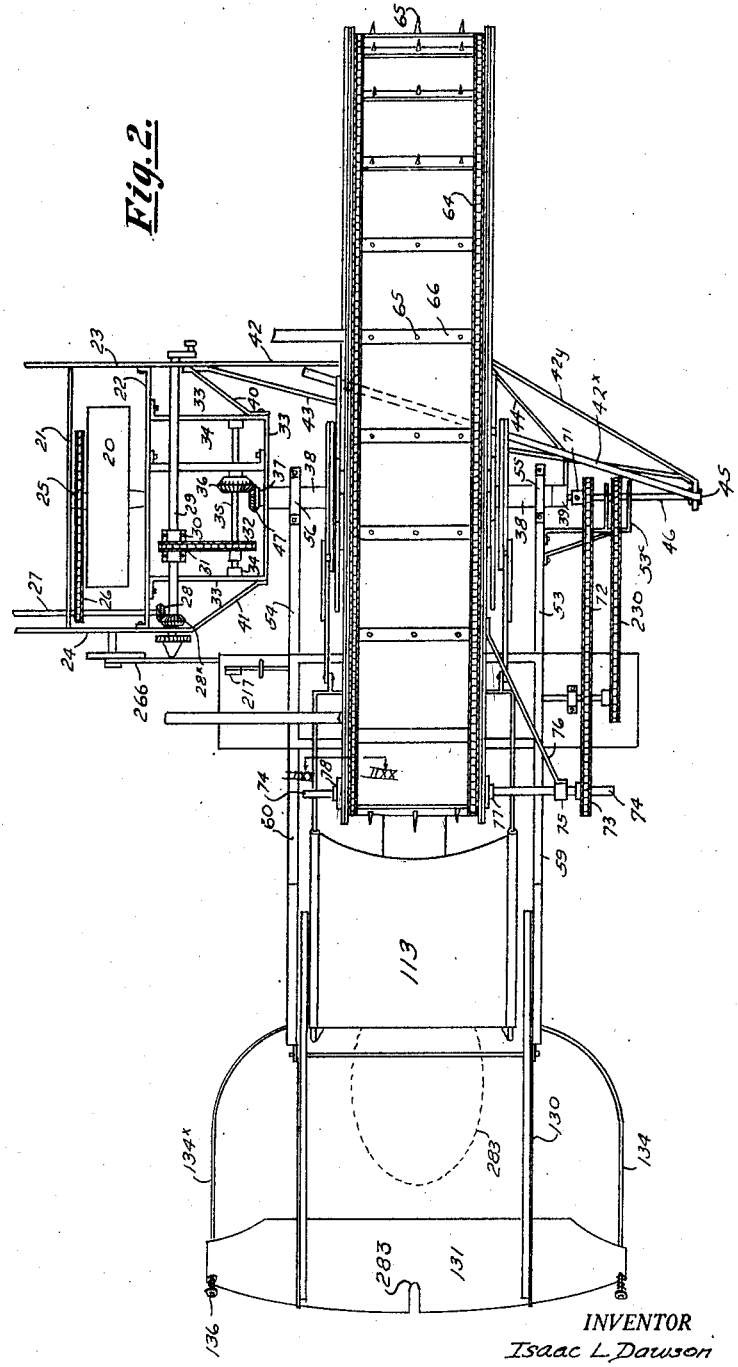

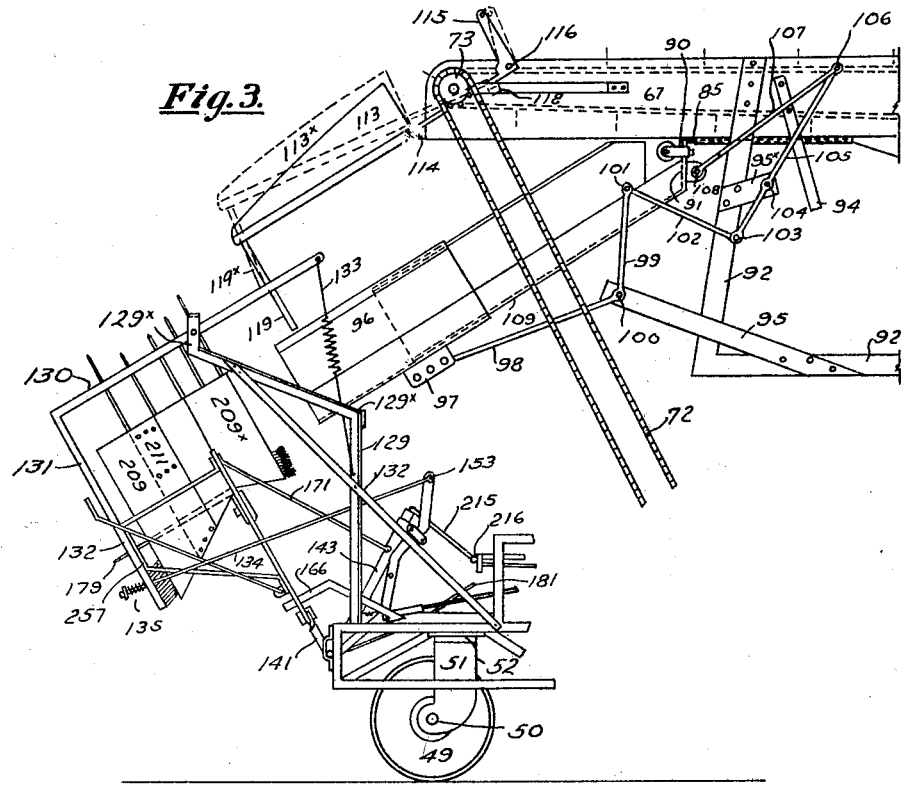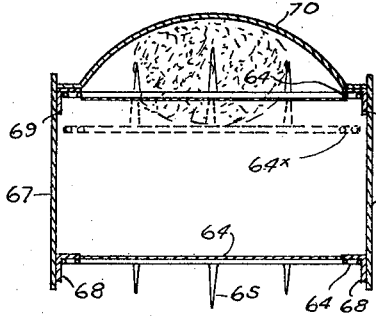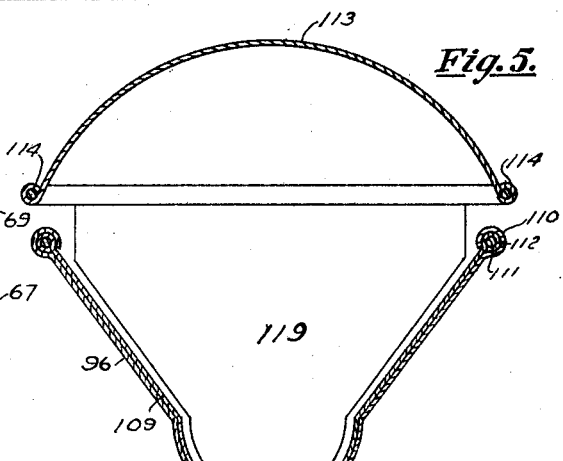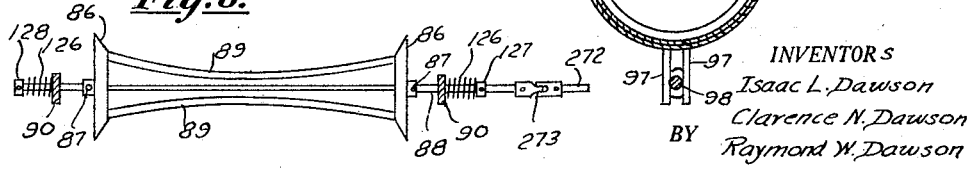

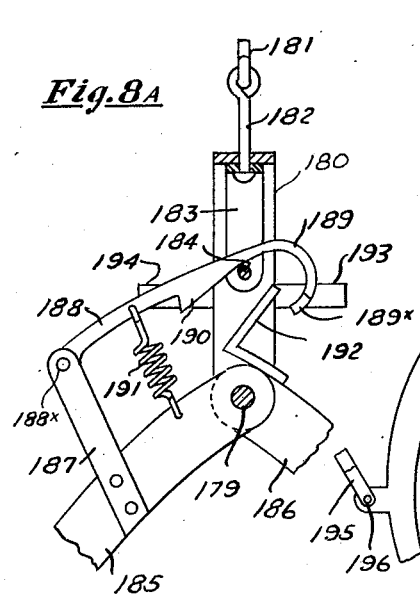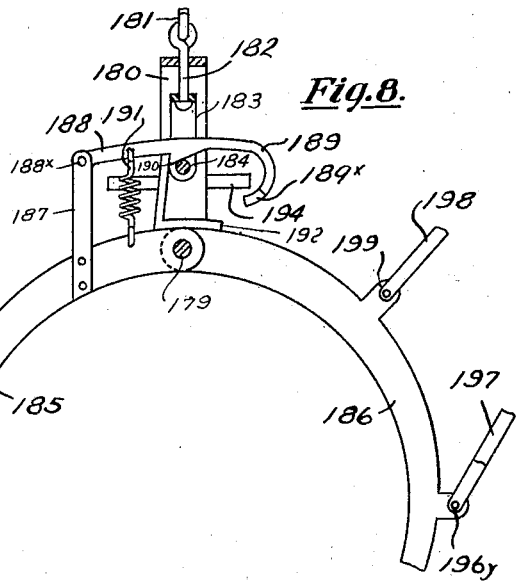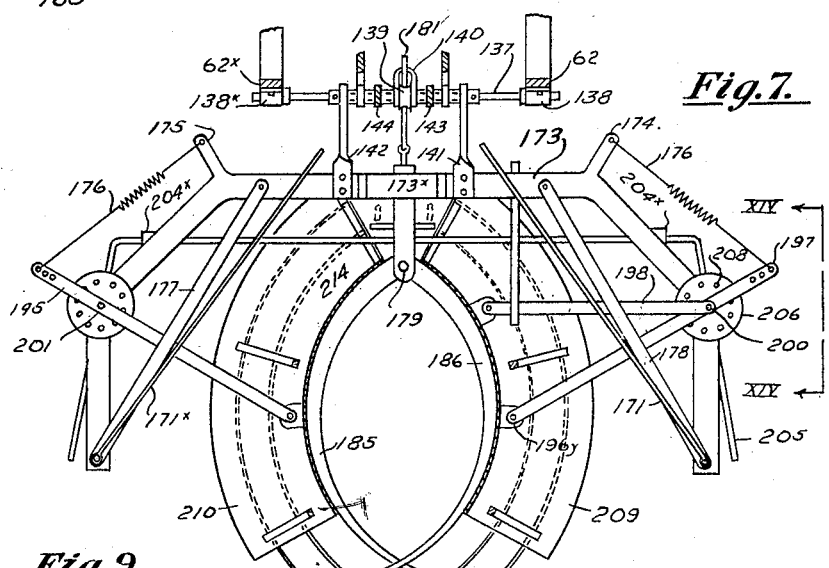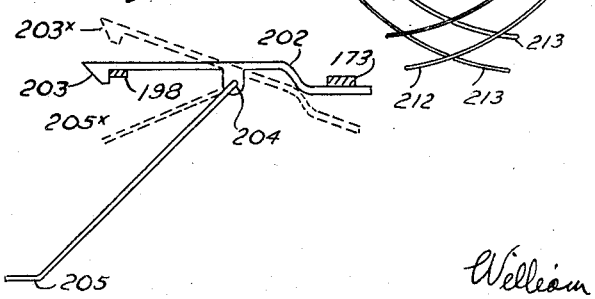

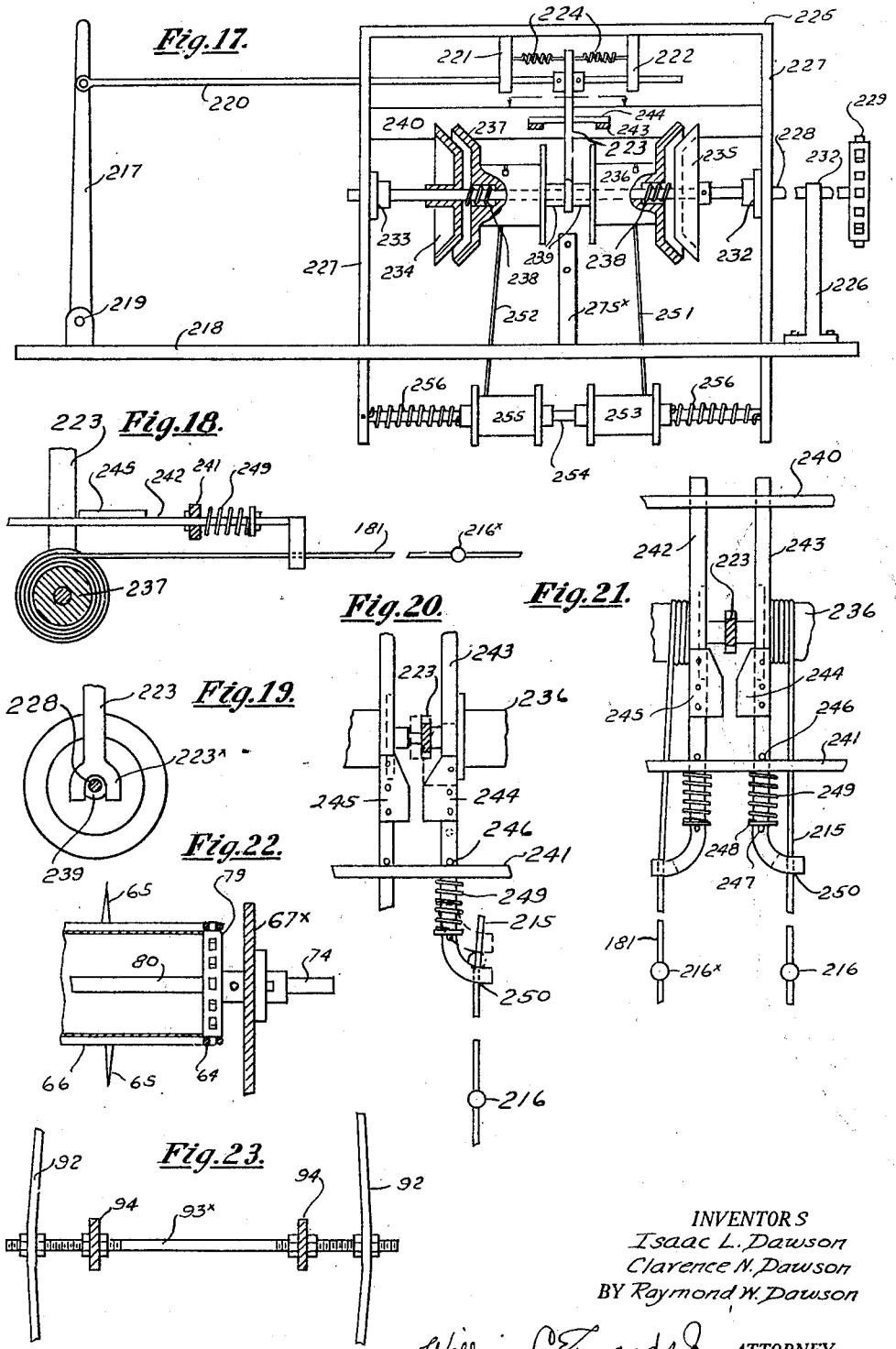

Jan. 22, 1929.
I. L. DAWSON ET AL
1,699,584
SHOCKING MACHINE
Filed Feb. 12, 1927
7 Sheets-Sheet 7
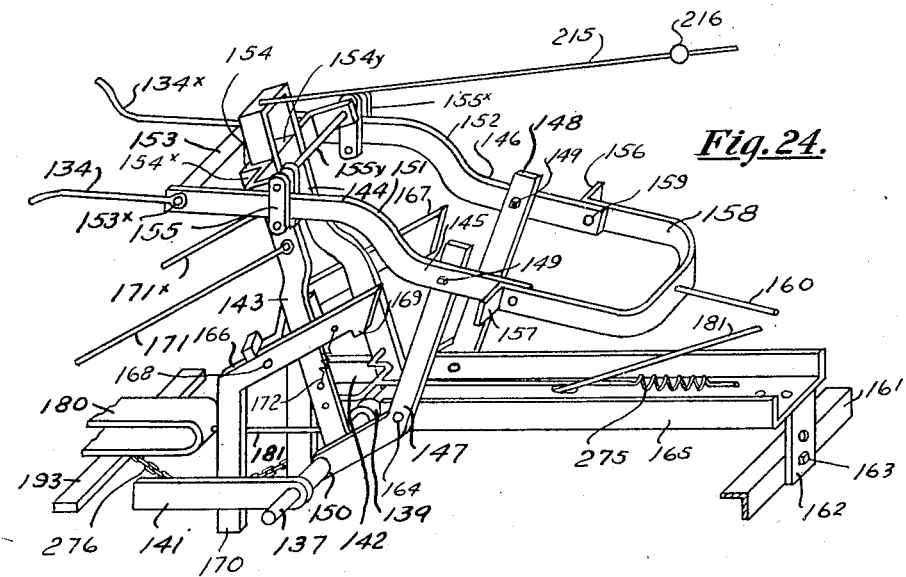
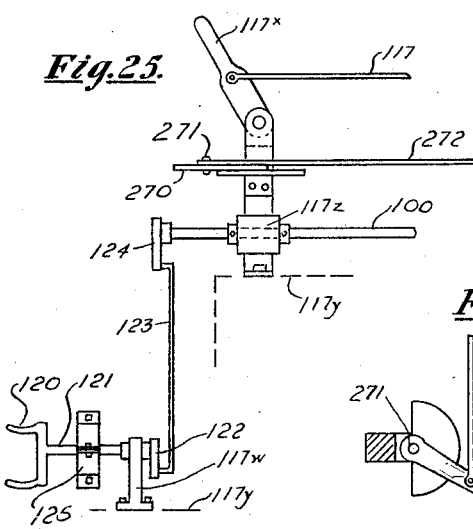
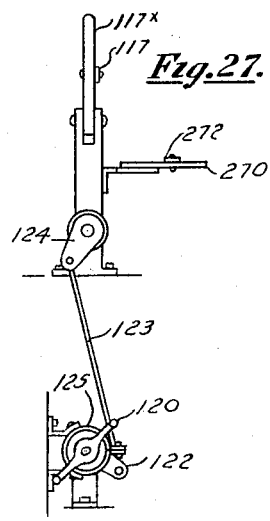
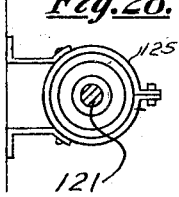
INVENTORS
Isaac L. Dawson
Clarence N. Dawson
BY Raymond W. Dawson
William Edwards Jr. ATTORNEY Patented Jan. 22, 1929.

1,699,584

UNITED STATES PATENT OFFICE.

ISAAC L. DAWSON, CLARENCE N. DAWSON, AND RAYMOND W. DAWSON, OF LAWRENCE, KANSAS.

SHOCKING MACHINE.

Application filed February 12, 1927. Serial No. 167,749.

The invention relates to a machine adapted for combination with and at the side of a binder and has gear means driven from the bull wheel of the binder for various power uses. We furnish a traveling conveyor means in combination with a curved trough element for receiving, passing and turning bundles and means for casting the bundles against an abutting plate as a straight edge for lining up the bases of the bundles; shock former and clamping means associated therewith for supporting bundles, thence clamping and dropping the clamped bundles to a ground position, thence effecting the release of the clamping means without disturbing the set of the shocked bundles. We form the shock as an oval rather than as a round shock, this arranges the bundles so as to permit an air passage lengthwise through the shock which assists in curing the grain straw. We employ a caster wheel to support the weight of the shocking mechanism. The elevating mechanism is carried from the binder independently from the trailer.

The invention is similar in purpose to that disclosed in our pending application for Letters Patent, Serial No. 114,195, filed June 7, 1926. In the present invention we have provided an entirely novel method of reversing the bundles and for positioning them against the straight edge abutting board. Also various improvements have been made to the prior described shock forming mechanisms.

The effect of aligning the butts of the bundles against the abutting board, the compact arrangement of the bundles one upon the other in the shock forming means expanded, thence the clamping of the shock forming means with a force incidental to the dropping while compacted and the later release of the shock is claimed.

Referring to the drawings; Fig. 1 is a side view of our shocking machine as arranged at the side of a grain binder and adjacent the deck thereof and showing operative elements in allied positions at the time of the depositing of a plurality of bundles as a completed shock. Fig. 2 is a top view of Fig. 1 with the binder deck omitted to disclose operative binder elements beneath the same. Fig. 3 is a side view of the shocker elements in their raised position ready to receive bundles from the carrier and for later pivoted depositing movements comparable to that seen in Fig. 1. Fig. 4 is a sectional view taken along the line IV—IV in Fig. 1. Fig. 5 is a sectional view taken along the line V—V in Fig. 1 through the bundle chute and hood assembly. Fig. 6 is a view looking in the direction of the arrows VI—VI Fig. 1, to disclose a face view of the roller paddle combination. Fig. 7 is a view of the shocker as closed in Fig. 1, and as taken along the section VII—VII looking in the direction of the arrows. Fig. 8 is a detail view of the latch mechanism of the shock forming device seen in Fig. 7 in its open position as in Fig. 3. Fig. 8$^A$ is a detail of the parts seen in Fig. 8 in the closed position seen in Fig. 7. Fig. 9 is a detail view of another latch seen in Fig. 7. Fig. 10 is a view taken along the line X—X Fig. 1 looking in the direction of the arrows to show the attachment of the curved conveyor track mechanism as supported on the tubular shaft; and also showing the sideboard assisting bundle reception from the binder deck upon the conveyor means. Fig. 11 is a detail partly in section of the elements allied with the main driving shaft and the tubular housing. Fig. 12 is a sectional view taken along the lines XII—XII, Fig. 1. Fig. 13 is a view taken along the line XIII—XIII, Fig. 11 looking in the direction of the arrows. Fig. 14 shows the disc plate and pivotal assembly seen in Fig. 7 for controlling the squeezing arm movements of the shocker. Fig. 15 represents a vertical sectional view through the side elements of the shocker identified with a squeezing arm member. Fig. 16 is a detail of the lever for controlling the slidable adjustment of shocker with respect to the conveyor. Fig. 17 is a cross-sectional view looking in the direction of the arrow XVII, Fig. 1 and to show elements associated with the winding drum and lever controlling assemblies. Fig. 18 is a cross-sectional view of a winding drum seen in Fig. 17 and looking towards the automatic clutch disengaging means. Fig. 19 is a detail of the forked lever seen in Fig. 17. Fig. 20 is a detail of the shifted forked lever seen in Fig. 17 and by dotted movements of plunger wedge elements is indicated the return to neutral of said forked lever for clutch release purposes. Fig. 21 is a detail view similar to Fig. 20 with the plunger elements positioned as seen in Fig. 17. Fig. 22 is a cross-sectional view taken along the line XXII—XXII in Fig. 2. Fig. 23 is a sectional view looking in the direction of the arrows in Fig. 1 at XXIII—XXIII. Fig. 24 is an isometric view of the pivotable lever assembly viewed in Fig. 1 associated with the shockformer and abutting board elements. Fig. 25 is a detail of the foot lever control of the chute elements; also of the lever for controlling the position of the hood; and also the lever for controlling the position of the paddle roller. Fig. 26 is a plan view of the lever controlling the position of the paddle roller. Fig. 27 is a side view of the lever systems illustrated in Fig. 25. Fig. 28 is a detail of the friction clamp seen in Fig. 25. Fig. 29 is a detail of the ground spike and adjacent arm elements to show in cross-section and side view the position of the canvas guard.

Similar numerals of reference indicate corresponding parts throughout all the figures of the drawings.

In Figs. 1 and 2; the bull wheel 20 of a grain binder is provided with the axle 25; at 21, 22, 23 and 24 are seen frame elements of the binder. From a sprocket on the bull wheel the chain 26 drives a sprocket rigid to the shaft 27 carrying a bevel gear 28 which meshes with the bevel gear $28^x$ on the pitman shaft 29. A split sprocket 30 is rigidly clamped to the pitman shaft 29 to enable us to secure power from the binder wheel 20 for operating our auxiliary machinery. A chain 31 driven from sprocket 30 leads around and drives the sprocket 32 rigid to shaft 35. Frame members 33 attached to the binder frame support bearings 34 for the shaft 35. A bevel gear 36 on shaft 35 meshes with the bevel gear 47 on shaft 46. At 37 in the member 33 is a bearing for the shaft 46. At 38 is a tubular housing and at the outer end at 39 a bearing is shown for the shaft 46, or so that the shaft 46 is axially arranged within the housing 38. At 40, 41, 42, $42^x$, $42^y$ and 43 are seen brace elements leading from binder frame elements to outer supporting positions relative to the shaft 46. The brace 44 leads from the members 42 and 43 to the bearing 39 as a support. At 45 is a bearing for the outer end of shaft 46. The inner end of shaft 46 carries the driven gear 47. A keyway 48 is provided on the outer portion of the shaft 46.

At 49 is seen a caster wheel rotating on the shaft 50 supporting the upright side members 51 and at 52 is a pivotable bearing for the side members 51. A pair of arms 53 and 54 attach at 55 and 56 to the tubular housing 38 as later explained. The members 53 and 54 connect at their outer ends to the upright frame elements 57 and 58, respectively. The member 58 extends down for control lever attachments later explained. Paired horizontal members 59 and 60 are the outer side elements of the frame supported by the caster wheel 49, these members attach rigidly to the members 57 and 58. And at 61 is seen one of the lower pair of frame members connecting to a member 59 by the frame member 62. Braces $53^a$ and $53^b$ connect from frame 53 to sprocket shifter $53^c$.

At 63 is a side board element for the bundle conveying mechanism 64, which is canvas conveyor belting if desired or simply a pair of chain side elements connected by transverse slats 66 carrying spikes 65. Side members 67 for the conveyor are of U-shaped configuration and are fitted with angle elements such as 68 and 69 as guides as well as stiffening members. At 70 is a metallic trough like element rigid to the sides 67—67. A sprocket 71 is keyed to the shaft 46 and carries a chain 72 to drive the sprocket 73 rigid to shaft 74 at the upper end of the conveyor. This shaft 74 is extra long so the assemblage can be adjusted and then fixedly fastened from the binder or so that the board 63 is at a proper spaced distance from the binder deck or so that the grain bundles dropped from the binder deck will fall upon the conveyor 64 as in Fig. 10. The angles 68 and 69 furnish guiding means for the chains 64 of the conveyor. The board 63 projects within the bellshaped lower end of the trough 70. A bearing 75 carried by the brace 76 supported by the frame 67 houses the shaft 74. Bearings 77 and 78 adjacent the sides 67 also house the shaft 74. At 79 are seen sprockets rigid to shaft 74 and a roller 80 for driving the conveyor 64. At the lower end of the conveyor 64 is a shaft 81 carrying a roller not shown while sprockets 82 carry the chains 64. The driven shaft 46 thus drives the conveyor 64 in its U-shaped carriage or so as to receive a bundle in Fig. 10 carry it in the direction of the arrow to the tunnel 70 thence upwardly intermediate the tunnel 70 and conveyor 64 Fig. 4 the butt of the bundle going upwardly and it will thus be seen that the U-shaped assembly turns or reverses the position of the bundle so that as it nears the top of the curved carriage the butt faces towards the rear. As in Fig. 4 the thickness of the bundle is accommodated by the yielding of the conveyor 64 to the dotted position $64^x$. The upper end of the carriage lies in a horizontal arrangement as seen in Fig. 1 as the side $67^x$. The trough 70 terminates in the flat plate 83 ending at the point $83^x$. Below the member 83 is another member 84 spaced apart to form a rectangular pocket and within which the slidable floor element 85 is pocketed.

Fig. 6 shows a roller element having disc-like ends 86, collars rigid at 87 to the shaft 88 as spacers for the rollers 86. It will be seen that intermediate the disc ends of the rollers are formed a plurality of transverse ribs 89 and it will be seen that these ribs are deeper next the discs than at the center or so that a bundle passing butt end first rearwardly off of the floor 83 will tend to center or ride intermediate the discs 86. The shaft 88 is adjustably and slidably mounted in supports 90, which compose a U-shaped element bolted to an element 91 which is rigid to the floor element 85 and is downwardly bent therefrom and as a part thereof. A pair of braces 92 of L-shaped character are attached to the respective side members 67 as at 93—93. Also a pair of braces 94 attach as at 93ˣ and 93ʸ to the braces 92 and side elements 67. Also braces 95 and 95ˣ are provided on either side of the members 67 and are attached as at 93ʷ and 93ᶻ to such braces 92. The braces 92 and 94 serve to strengthen the conveyor carriage mechanism as will be readily understood. The braces 95 and 95ˣ are for a different purpose.

Referring to Fig. 5 is a seen a telescopic bundle chute combination composed of a flaring trough-like outer sheet metal chute element 96 which has a pair of lugs 97 rigid thereto and to which a bar 98 pivotally connects. The element 98 is rigid with the element 99 which forms an angle therewith as seen and the composite lever 98—99 is rigidly attached to the shaft 100 rocking in bearings in the braces 95. It will be understood that the member 98 is forked beyond the section taken in Fig. 5 so as to attach to the shaft 100 on either side of the members 67, thus there are two members 99 also. To each member 99 is pivotally linked a member 102 as at 101 and which pivotally connects at 103 with another member 105 which rocks on a support 104 carried by the brace 95ˣ. The forked brace 107 pivotally connects to the lug supports 108 on rear element 91, and each outer end of the brace 107 pivotally connects as at 106 to the rocking element 105. The inner chute 109 telescopically fits the chute 96. The edge 110 of chute 96 is bent around the edge 111 of chute 109, the edge 111 is reinforced by a rod 112. Movements of shaft 100 cause lever movements of the train of elements 98—107 inclusive to vary the relationship of the parts 96 and 109 with respect to each other as seen in Figs. 1 and 3 for purposes later explained. A hood 113 Fig. 5 has an edge element 114 composed of a bar of U-shaped character, each leg thereof forming a lever 115 and arranged to pivot as at 116 on elements carried from the sides 67ˣ. A cable 117 leads from the lever 115 to the driver of the binder so that he may when desired pivot the hood 113 to the dotted position 113ˣ. The stop 118 serves as a rest for the edge bar member 114. At 119 is a stop board carried by the end portion of the hood 113. The foot lever 120 near the driver of the binder enables him to rock the shaft 121 provided with an arm 122 linked by a member 123 to arm 124 to rock shaft 100. A friction element 125 acts as a brake to enable the shaft 100 to be stopped and held at any position. 117ʷ and 117ᶻ are bearings on the frame 117ʸ of the binder.

The bundle carried by the conveyor 64 has traveled upwardly as in Fig. 4 to the end of the trough 70 and floor 83ˣ. Figs. 1 and 3 show a variation in position of the roller 89 over which the bundle drops off the floor. In Fig. 1 by action of foot lever 120, the shaft 100 has actuated the lever system 98—107 to draw backwardly the outer chute element 96 and to project the floor member 85 rearwardly. The lever 117ˣ released dropped the hood 113 to the stop position 118 and the stopboard 119 dropped to the position seen in Fig. 5 closing the chute. The bundles drop off the paddle roller 89 into the chute 109 and the stop board 119 stops them. By shifting the roller 89 in either direction by the driver moving the rod 88, the bundles can be shifted to either side of the chute 109 as it fills. The springs 126 intermediate stops 90 and rod elements 127 and 128 normally position the roller in a centralized relationship to the chute 109 unless otherwise desired. The shaft 100 can be actuated again to reposition the chute as it fills or so that bundles can be dropped upon lower bundles. The incoming bundles striking paddles 89 help to settle lower bundles by causing the paddle rotation to strike the upper ends of the lower bundles. The foregoing arrangement of the closure of the chute 109 by board 119 is necessary during the time interval of setting a shock. As soon as the shock has been set and the abutting board and shocking mechanism, later described, have been returned to the position illustrated in Fig. 3 then the shaft 100 is shifted to lower the outer chute 96 to its limit and to draw rearwardly the floor 85 within the pocket. The hood is raised to the dotted position 113ˣ and the bundles previously collected in the closed chute assembly 109—119 are permitted to fall or slide down the chute 109—96 when they are caught within the shockformer and stopped and aligned by the abutting board. Each other bundle carried upwardly by the conveyor 64 in the curved trough 70 is thus cast off the lower end of the chute 96 against the abutting board. When there have been sufficient bundles passed to the shockformer to make a desired shock, then the driver again steps on the pedal 120 and operates the lever 117ˣ to bring the hood and parts 96—109 to the prior position described as of Fig. 1. The bundles to form the shock are deposited from their supported position on the abutting board and shockformer seen in Fig. 3, to the shocked position seen in Fig. 1 and by the means and methods next described.

Upright braces 129 carried from frame elements 59 and 60 bend rearwardly as at 129ˣ as the post supports for the pivotable arm elements 130 of the abutting board 131 which is rigidly affixed thereto. Braces 132 stiffen the braces 129 to the frame elements 59—60 as seen. A tension spring 133 connects from brace 129 to end of arm 130 normally acting to help hold the abutting board lifted as in Fig. 1. At 134 and 134ˣ are a pair of pull rods connecting to the abutting board 131 with springs 135 intermediate end elements 136 and the board 131.

In Figs. 1 and 7 is seen the shaft 137 horizontally arranged at the rear of the frame members 62 and 62ˣ. The shaft has some vertical shifting movement permitting a warping of the shock former during setting of the shock on uneven ground, this shifting of the shaft 137 is permitted within the slot provided by elements such as 138 and 138ˣ attached to the frame members 62—62ˣ. A roller 139 is positioned between collar elements on the shaft 137. At 140 is a shield cooperating with the roller to position a cable 181. Pairs of arm levers 141—142 and 143—144 engage to the shaft 137 as seen. A pair of bars 145 and 146 are pivotally supported as at 149 on the bars 147 and 148 carried by the shaft 137 as at 150. The bars 145 and 146 are bent as at 151 and 152 for purposes later explained. The inner end of a rod 134 connects as at 153ˣ to the end of the bars 145 and 146, rigidly braced and spaced by the member 153.

A member 154 ties the bars 143 and 144 together and terminates in reverse U-shaped end portions 154ˣ. A wooden block 154ʸ and bolt means through the member 154ᵐ block 154ʸ and bars 143 and 144 insure rigidity of the allied parts. At 155 and 155ˣ are seen clevis means adjacent the outer legs of the elements 154ˣ and a bolt 155ʸ passing through the ends of each clevis and the outer legs 154ˣ furnishes passages for the bars 145 and 146 as will be readily understood or so that the curved bent portions 151 and 152 will have an influence upon the relationship of the levers 143 and 144 under conditions later mentioned. On the ends of the bars 145 and 146 will be noted a U-shaped element 158 having end portions 156 and 157 as projections for latch engagement purposes. The member 158 pivotally connects as at 159 to said bars 145 and 146. A spring 160 leads from the member 158 to a frame support to maintain a spring tension on the parts. The cross angle support 161 is carried by frame members 59 and 60. Mounted on the angle 161 is a vertical support 162 adjustably bolted to said angle at 163. At 164 is a riveted connection for such bars 147 and 148 to the channel 165 supported on the member 162. Thus the pivotal points 149 are maintained at an adjusted desired position. Trip arms 166 and 167 pivotally connect as at 168 to the levers 143 and 144 with hook ends such as 169 facing towards the elements 157 and 159 for desired engagement or latching purposes, and with lower depending end portions such as 170 for specified purposes. Rods 171 and 171ˣ connect from the levers 144 and 143 to the outer ends of the U-frame of the shocker.

At 172 is seen spring means for normally maintaining a latched engagement of a hook 169 on a stop 157 as in Fig. 3 to hold the U-shaped shocker frame element 173 in its raised position as pivoted by its supporting lever elements 141 and 142 on the shaft 137. When the hooks 169 are disengaged then the shock frame 173 is permitted to lower to the position seen in Fig. 1 and as later explained. Arms rigid to the frame 173 are seen at 174 and 175. Tension springs 176 lead from the ends of the arms to pivotal bar elements later described. Braces 177 and 178 stiffen the frame 173. A ground spike 179 connects to the clevis 180. A slot 173ˣ forms a pocket in the frame 173 for the clevis 180. A cable 181 attached to the bolt 182 leads to a winding drum. A smaller clevis 183 carrying a pin 184 is supported within the clevis 180 and is connected to the bolt 182. A pair of arms 185 and 186 each forming the arc of a circle are formed of bar metal of tapering shape disclosed in Fig. 7. These arms pivotally connect to the ground spike 179 as seen in Figs. 8 and 8ᴬ. A brace 187 connects the arm 185 to a lever 188 pivoted at 188ˣ. The lever is bent to form the hooked end 189 terminating in the enlarged portion 189ˣ which will not pass through the slot of the clevis 183 within which the lever 188 is positioned behind the pin 184. The lever 188 has a latch element 190 and a tension spring 191 connects between lever 188 and arm 185. A catch on 186 is shown at 192 which in Fig. 8 is latched by hook 190 to hold the arms 185 and 186 open as in Fig. 3 to receive falling bundles from the bundle chute 96. When the cable 181 is wound up the pin 184 breaks the latch connection at 190—192. Then the clevis 183 draws on clevis 180 to cause a squeezing movement of the arms 185 and 186 and associated parts later described. Upon the clevis 180 is affixed a tripping bar having end elements 193 and 194 which under certain conditions operate to strike the parts 170 to break latch connections such as 169—157 in Fig. 3. The flat bars 195 connect the pivot 196 and a spring 176. Also flat bars 197 connect at pivot 196ʸ on arm 186 and lead to a spring 176. Flat bars 198 connect at 199 as a pivot on 186 and lead to the bolt 200 as a pivot which also pivotally engages the bars 197. Similarly the bolt 201 pivotally connects the bars 195 to the frame 173. Disc-like plates 206 and 207 carried by the member 173 at the bolts 200 and 201 are perforated as at 208 for adjustment purposes if desired. The arm 186 is provided with an outer sheathing of sheet metal formed in two sections 209 and 209ˣ adjustably bolted together at 211. Similarly sections 210 and 210ˣ are attached to the arm 185. The shape of the allied parts 209—209ˣ—210—210ˣ together with the arm features 186 and 185 and the forked elements 212 and 213 is such that they positioned as in Fig. 3 are open to receive the bundles dropped from the chute 96 which have been stopped by the abutting board 131 and thus tend to be aligned at their butts and to pile on top of one another to fill or partly fill between the arms 185—186 and the forks 212—213. A canvas 214 is attached to the rear ends of the members 209 and 210 passing around the ground spike 179. A cable 215 connects from the upper connection of the levers 143—144 to a winding drum. A clamp 216 is properly affixed to cable 215, also a clamp 216$^x$ is affixed to cable 181.

A lever 217 pivoted at 219 upon a frame member 218 carries a rod 220 slidably supported in members 221 and 222 on the frame member 225. A forked lever 223 is rigid to the rod 220 and is properly centered by tension springs 224 except when the lever 217 is shifted either way, and held. Frame supports 226 and 227 support a shaft 228 carrying a sprocket 229. A chain 230 driven from sprocket 231 on a keyway 48 on shaft 46 operates to drive sprocket 229 and shaft 228 rotatably mounted in bearings 232, 233. Clutch members 234 and 235 are rigid to shaft 228. Drum elements 236 and 237 are slidably arranged upon the shaft 228 intermediate the clutch members 234 and 235 with which they may be engaged since they carry suitable clutch face means to cooperate therewith as will be readily understood. Spring means such as 238 normally prevent clutch engagement. Each drum has a collar such as 239 and the collars are arranged contiguous the fork 223$^x$. Frame members 240 and 241 house sliding plungers 242 and 243 carrying wedge plates 245 and 244 rigid thereto. At 246 is a stop. At 247 is a stop. At 248 is a washer. At 249 is a spring normally holding a wedge from contact with the arm 223. The cables 181 and 215 pass through holes such as 250 in the ends of the plungers 242 and 243 and connect to the winding drums 237 and 236. A cable 251 leads around the drums 236 and 253; while a cable 252 leads around the drums 237 and 255. The drums 253 and 255 are rotatable upon the shaft 254 carried by lower frame elements 227, while spring means such as 256 attached to the drums and to the frame 227 serve to create a condition of said drums whereby the cables 251 and 252 are kept taut for the purpose of keeping up slack in the cables 181 and 215.

The shock former parts in Fig. 3 have filled with a suitable number of bundles to make a shock. The driver of the binder prevents more bundles dropping therein by shifting the chute assembly to the position seen in Figs. 1 and 5 which stops bundles from reaching the shocker until it has had time to be lowered and set a shock and be again returned to the position Fig. 3, when the bundles would be permitted to fall from the stop board 119, against the abutting board 131 and within the shocker arm elements. While the position seen in Fig. 5 was maintained, the arms 85 and 186 Figs. 3 and 8 were caused to assume the position seen in Figs. 7 and 8$^A$, this was done by shifting lever 217 to draw fork 223$^x$ against the hub 239 of drum 237 whereby drum 237 engaged by clutch 234 wound up cable 181, the latch connection 190—192 was broken, the bars 193 and 194 move towards the ends 170 of hook arms 169 latched at 167. The squeeze of arms 185 and 186 and allied former parts has been accomplished just as clamp 216$^x$ strikes the plunger 242 and the wedge 245 kicks the fork 223 back to neutral. The hooks 169 being also disengaged the cable 215 unwinds from the drum, as the weight of the shock and shocker together with the pull on cable 181 has caused the shock to lower towards the ground, the rods 134 have shoved the abutting board up to the position seen in Fig. 1 out of way of the descending shock. The ground spike is driven into the ground a distance and the runners 257 depending from the under side of the frame 173 strike the ground at the same instant as the butts of the composite shocked bundles as clamped in Fig. 7. At this point the latch arm 202 carrying the hook 203 which in Figs. 7 and 9 has been engaging the bar 198 to maintain the clamped position illustrated is lifted to the dotted position 203$^x$. The release of the hook 203 is effected by the trip rod 204 striking the ground at its outer ends. The trip rod is supported in the bearings 204$^x$ and the latch 202 is rigid to the trip rod hence the hook tends to drop over the bar 198 except when the action of the ends striking the ground affects the release. The movement of the binder constantly forwardly, the ground spike stays fixed in the ground or so that the frame 173 travelling also forwardly, the bars 195, 197 and 198 operate to swing open to the position seen in Fig. 8 thus releasing the shocked bundles through the rear opening between the expanded forked elements 212—213. When the runners 257 have traveled forwardly far enough, then the ground spike tends to lift out of the ground, that is it must also travel forwardly through the front portion of the shock, the canvas 214 has held a gap spacing the width of the spike between the bundles to permit the spike to pass out, then the bundles close together as the shock further settles into place. The lever is shifted again to move drum 236 to engage clutch 235 to wind up cable 215 to draw the levers 143 and 144 forwardly at which time the curved parts 151 and 152 moving through the clevises 155 give a rapid and quick movement to yank the abutting board down behind the raised shock former or as seen in Fig. 3. The hooks 169 engage with the elements 157—156 and the shock former is open as in Fig. 8 to permit the board 119 to be raised and bundles to drop between the arms of the shock former. Again the stop 216 reaches the hole 250 in the plunger 243 and the wedge 244 now drives the forked lever 223 to neutral as indicated by the dotted lines in Fig. 20.

In Fig. 13 is shown a detail of the slidable frame arm elements such as 54 and 53. The end is bent as at $54^x$ and a plate $54^y$ is bolted thereto as at 258. Between the space included between the parts $54^x$ and $54^y$ is positioned the tubular member 38 which bears against the roller 260 rotatable on the axle 259 carried by the parts $54^x$ and $54^y$. Thus the shocker frame elements 53, 54 and $53^c$ may be rolled or shifted so that they may drag from selected positions ($53^z$, $54^z$ and $53^c$) along the tubular member 38 and thus position the shock former with a sidewise adjustment with respect to the chute elements or so that by shifting the arms 53—54 bundles may be dropped towards the arm 186 or the arm 185 or intermediate the same as may be desired. This is desirable in arranging the bundles as they drop from the shock chute 96. Then by the vertical adjustment previously mentioned of the chute itself, a proper control is received or whereby the driver of the binder is able from his seat to pick the proper place to permit the bundles to drop off the chute 96. Movement or adjustment of the arms 53 and 54 is controlled by the lever seen in Fig. 16. Bolted to the lower frame of the binder (is a bar member) 261 supporting the posts 262. A horizontal member 263 slides in supports 264 carried by the posts 262 and leads to a connection on the frame element 265 associated with the elements 53—54. The lever 266 pivoted at 267 on the cross member $263^x$ has its keep associated in desired positions upon the arc element 268 carried by side supports 269 and whereby shifting of the lever to fixed stop positions on member 268 moves the lower end $266^x$ and the part $263^y$ so as to move the shock former arms 185 or 186 Fig. 8 to the right or left as desired. When the squeezing of the arms 185 and 186 is accomplished as in Fig. 7 the forks 212—213 pull the shock backwardly towards the ground spike 179 and the side edges of the arms 185 and 186 as in Fig. 15 make an impression in the shocked bundles tending to be maintained even after the release of the arms and forks is accomplished. It will be noted that a brace 282 stiffens the sides 210 and $210^x$ as lapped and fastened together. The lever 270 pivoted at 271 has a connection 272 flexibly coupled at 273 to the shaft 88 for adjustably positioning the paddle roller 89.

The cable 181 Fig. 1 leads over a roller 274 on a supporting bracket rigid to member 241.

The spring 275 connects from the members 143 and 144 Fig. 24 to the post $275^x$ Fig. 17 and the rod and spring assembly 160 also connects to the post $275^x$.

The chain 276 connects from the clevis 180 to the shaft 137. The length of the chain determines the travel of the clevis and takes the strain off the other parts.

In Fig. 10 the deck 277 of the binder is shown for delivering the bundles to the conveyor 64, as a considerable blow would be struck on the conveyor 64 at this point by the fall of each bundle, we employ the floor 278 for a distance under the member 63.

As the binder moves forwardly, the lever 266 is used to move the trailer sidewise in either direction; first, for distributing the bundles to their proper position in the shock former; second, to equalize side draft. When the binder turns a corner, the lever may be moved the proper direction and the latch 279 engages the handle 280 preventing engagement of the keeper in any notch on the member 268; this is done just before the lever 217 is moved to set the shock. As the shock sets firm on the ground due to its own weight as well as the ground spike, the frame elements 53 and 54 roll at 260 on the shaft 38 since the keeper 281 is disengaged. Thus nothing acts to tip over a shock. On sloping ground this lever furnishes a means of properly positioning the trailer to conform to ground positions so as to deposit the bundles at the right position in the shock former.

The weight of the shocking mechanism is nearly balanced over the caster wheel. The elevating mechanism is braced from the binder while the trailer has an independent side movement as stated. This oscillating side movement of the trailer thus accomplishes several and valuable features of the invention.

As the jaws 185 and 186 are clamped tight around the shock the bottom of the bundles are forced to flare out against the member 209—210. The center of the shock strikes the ground a little before the outer edges. The heavy pressure against the jaws 185 and 186 due to the compressed condition of the enclosed bundles is of assistance in affecting the release of the jaws at the proper time. During the setting of the shock the compression of the jaws acts as a shock absorbing device when the shock hits the ground, taking the blow instead of the runners and holding the shock in its oval compacted position during the release movement. This heavy pressure so compacts the oval shaped shock that binding twine is not necessary around the shock.

It will be noted that the straight edge board 131 has a slot 283 in its outer edge which is to pass the ground spike 179 when brought to position seen in Fig. 3. This board pivots from a suspended position and is drawn in from behind to stop when it hits the base of the runners 257. This board 131 in Fig. 3 stands at right angles to the direction of travel of the bundles dropping from the chute 96 and properly aligns the butts of the bundles; the bundles being somewhat sidewise in this aligned position compact and settle within the extended shock former arms prior to the clamping action. As stated the runners 257 stop the board when it strikes them, the springs 135 cushion the blow and permit the arms 134 to go ahead further, the hooks 169 passing the stops 156—157 and then settling back to an engagement therewith as previously mentioned.

Thus the driver of the binder is enabled to dispense with help to shock the bundles which are properly set up ahead of possible storms. The oval position of the shock as given by the preferred form of the clamping arm elements as stated permits an air current to circulate through a central passage such as is almost sure to occur by this setting of the shock.

Such modifications may be employed as lie within the scope of the appended claims. Having fully described our invention what we now claim as new and desire to secure by Letters Patent is:

1. A shocking machine as an attachment to a grain binder, power means on the shocking machine driven from power driven elements on the binder; a conveyor mechanism at the forward part of the machine comprising frame supporting elements; and a curved trough associated therewith for receiving bundles upon the conveyor, said mechanism providing means for conveying the bundles intermediate the trough and the conveyor, and for reversing the position of the bundles and for ejecting and dropping the bundles in a rearward direction.

2. A shocking machine having frame elements supported from a binder; a driven shaft on the machine; a curved U-shaped frame element housing a traveling conveyor mechanism, a curved trough, open at its ends associated with the inner face of the U-frame and adjacent the traveling conveyor mechanism, a bundle receiving space on the conveyor at the lower front opening of the trough and an adjustable floor element on the U-frame behind the rear opening of the trough.

3. In a shocking machine, a frame element of U-shape elevation positioned with its leg elements in a horizontal position with the base of the frame towards the front.

4. In a shocking machine, a frame element of U-shaped elevation positioned with its leg elements in a horizontal position with the base of the frame facing towards the front, a traveling conveyor within the frame element and roller mountings therefor, a trough facing the conveyor within the inner base portion of the U-frame, a paddle wheel at the outer end of the conveyor trough assembly and means for sidewise adjustment of the wheel.

5. In a shocking machine, a frame element of U-shaped elevation carrying a curved trough and a curved traveling conveyor in a cooperating relationship, an adjustable floor element at the rear of the trough element and below the conveyor, a bundle chute attached to the forward end of the floor element and a telescopic chute covering associated with the bundle chute, and means for occasioning telescopic movements of the allied chute elements.

6. In a shocking machine, a bundle conveying mechanism having a frame work as a support, a floor element beneath a traveling conveying mechanism, a chute carried by the floor element for receiving bundles drawn over the floor by the conveyor; a hood pivotally carried from the frame work provided with a stop board adjustable to close or open the base of the chute for the purposes specified.

7. In a shocking machine, a frame work as a support; a U-shaped conveyor housing, a traveling conveyor on roller mountings arranged and operable therein, a trough curved to conform to the inner U-shaped face portion of the conveyor, a slidable floor element at the rear of the trough, a telescopic chute element carried by the floor and a hood covering for the chute carrying a stop board and means for sliding the floor and for pivotally moving the hood for the purposes specified.

8. In a shocking machine of the class described, a horizontally disposed conveyor portion, a trough beneath the conveyor, a floor extension beyond the trough, a chute opening rearwardly from the underside of the conveyor behind the floor; frame means supporting the foregoing elements and other frame means having pivotable elements pivotally supported thereon; an abutting board as a straight edge plate carried by the pivotal elements and means for pivoting said plate transverse to the axis of the chute or upwardly therefrom.

9. In a shocking machine a trough element of U-shaped lengthwise curvature and a traveling conveyor mechanism arranged to travel in adjustable relationship to the base of said trough.

10. In a shocking machine a chute, a telescopic covering for the chute, a hood above the chute and a stop board carried by the hood for opening or closing the base of the chute.

11. A shocking machine for binders including a frame element supported from the binder; a tubular shaft, a driven axle within the shaft, a trailer having arm elements slidably mounted upon the tubular shaft.

12. A shocking machine for binders including a frame element supported from the binder, a tubular axle, a driven shaft within the axle, a frame element of U-shaped formation with the base of the U facing forwardly carried above the axle, a conveyor within the U-frame, roller mountings therefor actuated from the driven shaft, a trough facing the inner U-shaped conveyor face portion, an extensible floor at the upper end of the trough leading rearwardly, a chute leading from said floor; an abutting board pivotally depending from frame elements as a receiving support when pivoted transverse to the chute; a trailer having a caster wheel, arm elements slidably adjustable upon the tubular axle, a shocker frame pivotally mounted at the rear of the trailer, shock former arm elements pivotally adjustable intermediate the abutting board and the chute and means for clamping arm elements upon a spike element as a pivotal point, means for latching the arm elements in a clamped position; means for pivoting the depending abutting board upwardly and other means for pivoting the clamped arm elements downwardly and rearward of the axle, trip lever means for breaking the latch to permit means to expand the arm elements and effect a return of the arm elements again intermediate a downward pivoted abutting board and said chute.

13. In a shock forming machine, a U-shaped frame work, a clevis housed in a pocket thereof, a ground spike carried by the clevis, a pair of arm elements pivoted at the clevis, brace elements allied with the arms pivotaly connecting to the frame, a trip mechanism journaled in the frame carrying a latch for detachable engagement with a brace element.

14. In a shock former, a ground spike, a pair of tapering curved arms pivoted to said spike.

15. In a shock former, a ground spike, a pair of tapering curved arms pivoted thereto, outer sheathing on inner portions of said arms and curved rod elements attached to said sheathing.

16. In a shock former, a supported shaft, a U-frame having arms carried by the shaft as a point of pivotal support; a clevis housed in a pocket of the frame, a ground spike carried by the clevis, shock-forming arm portions pivoted to the ground spike, brace elements positioning pivotally said arm portions, latch and trip means associated therewith and a chain from the clevis to a support.

17. In a shock former, a ground spike, a pair of arm elements pivoted thereto, a sheathing for each arm element, a canvas attached to the rear edge of the sheathing elements and passing around the ground spike.

18. In a shock former, a pair of tapering arm elements on the inner face of side sheathing members, said arm elements being curved to face each other and being formed edge wise in cross-section to impart a grooved depression to shocked bundles upon a pivoted and connected movement of said arms towards each other.

19. In a shocking machine, a tubular shaft horizontally disposed as an axle element; a trailer, a caster wheel supporting the rear thereof, side arm elements for the trailer leading to the axle, a roller at the end of each arm element, rotatably mounted thereon and in a supporting engagement to the axle for permitting a sidewise rolling movement of the trailer upon the axle.

20. In a shock former, a pair of arm elements pivoted at a spike, each arm element being formed as a curved element facing the opposite arm element, flared sheathing elements covering the arm elements, and adjustable extensions therefor at the base of each sheathing element.

21. In a shock former, a trailer, a shaft horizontally disposed at the rear thereof and supported within slot elements for slight vertical adjustable movements, a U-frame having arms carried by the shaft as a pivotal support, a clevis pocketed to move in said frame, a ground spike carried by the clevis, shock former arm elements pivoted from the spike, brace elements pivotally centering the arms within the U-frame, latch and trip means for association with brace elements, latch and trip means and an inner clevis associated with the first clevis for the purposes specified.

In testimony whereof, we hereunto affix our signatures to the foregoing specification.

ISAAC L. DAWSON.
CLARENCE N. DAWSON.
RAYMOND W. DAWSON.